Figure 1:
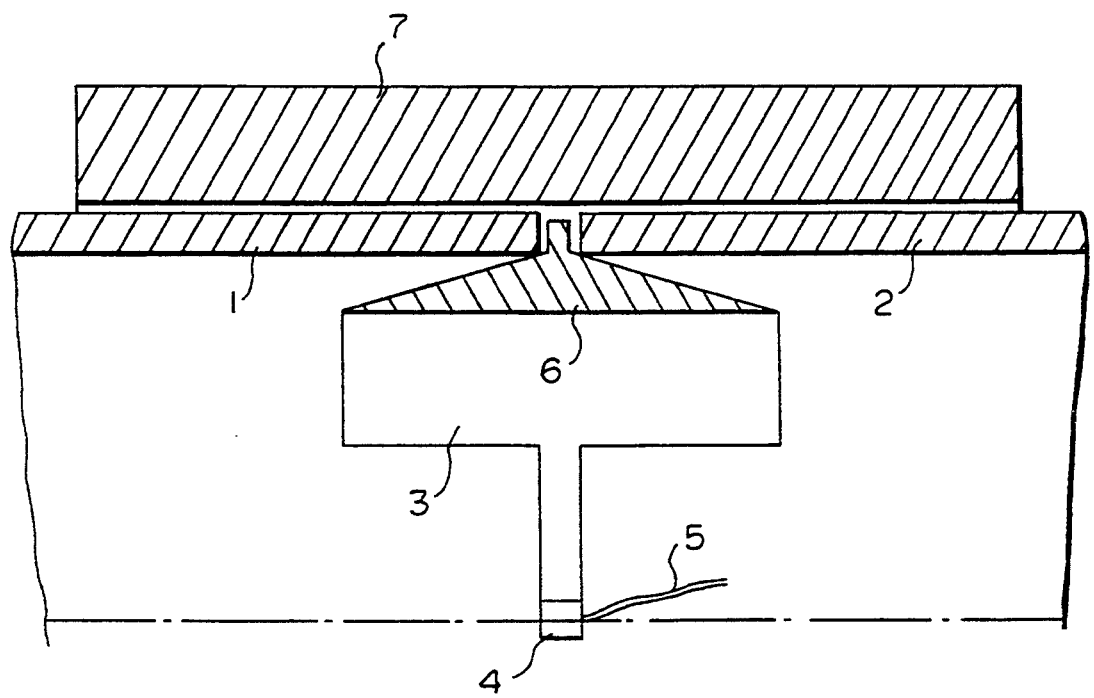

United States Patent [19]

Persson

[11] Patent Number: 5,377,898
[45] Date of Patent: Jan. 3, 1995

[54] METHOD FOR EXPLOSION WELDING OF JOINTS AND CATHODE PROTECTION OF PIPES

[75] Inventor: Tor Persson, Kristianstad, Sweden

[73] Assignee: International Technologies A/S, Oslo, Norway

[21] Appl. No.: 124,633

[22] Filed: Sep. 22, 1993

[51] Int. Cl.⁶ .............................................. B23K 20/08
[52] U.S. Cl. ................................ 228/107; 228/262.44
[58] Field of Search ......................... 228/107–109, 228/262.41, 262.44, 214, 2.5; 29/421.1, 421.2

[56] References Cited

U.S. PATENT DOCUMENTS

| | | | |
|---|---|---|---|
| 4,098,451 | 7/1978 | Smith et al. | 228/119 |
| 4,099,661 | 7/1978 | Dick et al. | 228/107 |
| 4,934,952 | 7/1990 | Banker | 228/175 |
| 5,176,025 | 1/1993 | Butts | 73/40.5 R |

FOREIGN PATENT DOCUMENTS 2106817  4/1983  United Kingdom ................ 228/107
2158908  11/1985 United Kingdom ................ 228/107

OTHER PUBLICATIONS

John R. Birchfield, "Big Boom Bonds Metals to Resist Environments", Welding Design & Fabrication, pp. 78–83, Jun. '82.

Primary Examiner—Samuel M. Heinrich
Attorney, Agent, or Firm—Browdy and Neimark

[57] ABSTRACT

For cathodic protection of piping a sacrificial anode sleeve is placed around the pipe and caused to form an electrically conductive connection with the pipe by means of detonation of an explosive charge within the pipe, in the region covered by the sacrificial anode.

4 Claims, 1 Drawing Sheet

METHOD FOR EXPLOSION WELDING OF JOINTS AND CATHODE PROTECTION OF PIPES

The invention relates to a method for joining abutting pipes by explosion welding, where there is placed inside the two pipes, positioned end-to-end, an explosive charge which is detonated, there first having been placed on the outside of the joint a support in the form of an annular member surrounding the region of the joint.

According to the invention it is proposed that an annular member shall include or be composed of a material which will, through the explosive welding, form an electrically conductive connection with the pipe material and have properties of a sacrificial anode relative to tile pipe.

Pipes that are joined offshore require corrosion protection at the site where the pipe ends are welded together. Such field jointing may be accomplished, for example, by applying a special tape and filling out the remaining gap to the diameter of tile concrete coating usually used on the pipes. The filling is done with a suitable mastic filler material.

Unprotected steel structures, such as offshore pipelines, require corrosion protection, which may be achieved through cathodic protection, i.e., with the aid of sacrificial anodes.

With this invention a simple and cost effective method is attained for the necessary corrosion protection of piping.

The aforementioned annular member, after being used as a support, will be electrically connected with the pipeline and therefore, due to tile choice of material, can function as a sacrificial anode.

The annular member in itself may form the entire support, or it may constitute only a part of the support, e.g., with a ring or circular bail around the annular member.

Examples of appropriate materials in connection with steel piping are zinc and an aluminum (95%)/zinc (5%) alloy.

The invention may also be regarded as a method for placement of sacrificial anodes on a pipeline. According to the invention, therefore, there is also proposed a method for cathodic protection of piping, where the pipe is encircled by an annular member made of a material capable of forming an electrically conductive connection with the pipe material and functioning as a sacrificial anode relative thereto, which method is characterized in that the electrically conductive connection is provided by detonating by suitable means an explosive charge inside the pipe within the region covered by the annular member.

It should be noted that it is known from GB-A 941 896 to encircle a pipe with an annular member made of a material capable of forming an electrically conductive connection with the pipe material and Functioning as a sacrificial anode relative thereto.

With the method as indicated above, one attains the same advantages as those mentioned above in connection with the method relating to the actual explosion welding of a joint.

Figure 2:
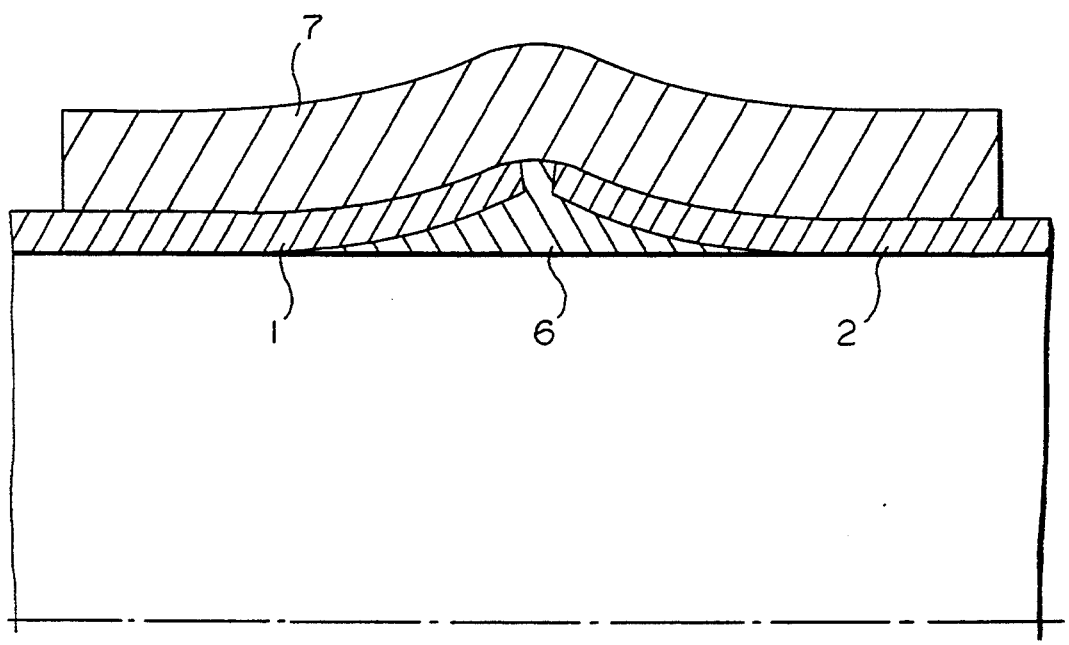

The invention will be described in further detail with reference to the drawings, where:

FIG. 1 shows a schematic half-section through two pipes to be joined by explosion welding according to the invention, and FIG. 2 shows the same region after completion of the explosion welding.

In the figures are shown two pipes 1 and 2, which are placed together end-to-end and are to be joint welded with the aid of an explosive charge 3 with detonator 4 and fuses 5. Provided between the explosive charge 3 and pipes 1 and 2 is an annular member 6 which becomes a part of the joint after the explosive welding, see FIG. 2.

On tile outside of the joint region, either as a part of a support device or as the support itself, there is indicated an annular member or sleeve 7. The situation after the explosive welding of the joint will be as shown in FIG. 2. Sleeve 7 is now electrically conductively connected with the joined pipes 1 and 2 and with the inner transition or bridging component 6.

The material in sleeve 7 is selected so as to enable the sleeve to function as a sacrificial anode for pipe 1,2.

Sleeve 7 may constitute the actual support, as mentioned above, but it may also be included as part of a support device which, for example, may include a circular bail clasped around sleeve 7, optionally together with an interlying, crushable material which crumbles during and after the explosion and thereby releases the clasping tension between sleeve 7 and the surrounding remaining part of the support, not shown.

One may envisage a variant of the invention wherein sleeve 7 is slid onto a pipe, but not in the region of a joint, and is joined with the pipe by means of detonation of an explosive charge within the pipe. In principle, one will then attain the same situation as that shown in FIGS. 1 and 2, with the exception that the joint itself is not in evidence.

If pipes 1 and 2 are fabricated of steel, a suitable material For sleeve 7 will be zinc; or an aluminum/zinc alloy.

Having described my invention, I claim:

1. A method for joining abutting pipes by explosion welding, where there is placed inside the two pipes positioned end-to-end, an explosive charge which is detonated, there first having been placed on the outside of the joint a support in the form of an annular member surrounding the region of the joint, characterized in that the annular member includes or is composed of a material which will, through the explosive welding, form an electrically conductive connection with the pipe material and have properties of a sacrificial anode relative to the pipe.

2. A method for cathodic protection of piping, where the pipe is encircled by an annular member made of a material capable of forming an electrically conductive connection with the pipe material and functioning as a sacrificial anode relative thereto, characterized in that the electrically conductive connection is provided by detonating by suitable means an explosive charge inside the pipe within the region covered by the annular member.

3. The method according to claim 1, wherein the material is selected from the group consisting of zinc, aluminum, and zinc-aluminum alloy.

4. The method according to claim 2, wherein the material is selected from the group consisting of zinc, aluminum, and zinc-aluminum alloy.

* * * * *